(12) United States Patent
Schmuck

(10) Patent No.: US 8,088,086 B1
(45) Date of Patent: Jan. 3, 2012

(54) AUTOMATED PET SCRATCHING DEVICE AND ASSOCIATED METHOD

(76) Inventor: Allison J. Schmuck, Portland, OR (US)

(*) Notice: Subject to any disclaimer, the term of this patent is extended or adjusted under 35 U.S.C. 154(b) by 1229 days.

(21) Appl. No.: 11/821,365

(22) Filed: Jun. 22, 2007

Related U.S. Application Data

(60) Provisional application No. 60/815,384, filed on Jun. 22, 2006.

(51) Int. Cl.
*A61H 7/00* (2006.01)

(52) U.S. Cl. .................. 601/84; 601/89; 601/93; 601/95

(58) Field of Classification Search .................. 601/84, 601/87, 92, 93, 94, 95, 103, 111, 117, 134, 601/136, 137; 119/174, 600–633; 132/119.1
See application file for complete search history.

(56) References Cited

U.S. PATENT DOCUMENTS

| | | | |
|---|---|---|---|
| 3,403,674 A * | 10/1968 | Alimanestiano | 601/134 |
| 3,599,606 A * | 8/1971 | Hayward | 119/174 |
| 4,747,371 A | 5/1988 | Leopold | |
| 4,807,569 A | 2/1989 | Leopold | |
| 4,872,422 A * | 10/1989 | Della Vecchia | 119/621 |
| 4,907,540 A | 3/1990 | Reynolds | |
| 4,926,796 A | 5/1990 | Leopold | |
| 5,016,617 A * | 5/1991 | Tarlow et al. | 601/117 |
| 5,440,186 A | 8/1995 | Forsell et al. | |
| 5,842,440 A | 12/1998 | Bell, Jr. | |
| 6,378,462 B1 | 4/2002 | Gaves et al. | |
| 6,994,680 B1 * | 2/2006 | Aponte | 601/137 |

* cited by examiner

*Primary Examiner* — Justine Yu
*Assistant Examiner* — Valerie L Skorupa
(74) *Attorney, Agent, or Firm* — Montgomery Patent & Design, LLC; Robert C. Montgomery; Joseph T. Yaksich

(57) ABSTRACT

The invention as presently conceived discloses a motion-activated, mechanical apparatus that can be mounted onto a wall to provide the automatic scratching of a house pet, specifically a cat. The new and novel apparatus is configured with four independent mechanisms resembling human fingers, less the thumb, in both appearance and in movement. The fingers would be covered with a latex material to closely approximate the feel of real fingers. The mechanical apparatus would be mounted on a wall structure at an appropriate height to best facilitate the petting and scratching of the owner's particular pet. In operation, the artificial finger-like appendages would have a drive mechanism, electrical motor and be powered by a battery. A motion sensor, such as a close range infrared detector or similar device, would activate the fingers as the pet came into close proximity.

8 Claims, 4 Drawing Sheets

AUTOMATED PET SCRATCHING DEVICE AND ASSOCIATED METHOD

RELATED APPLICATIONS

The present invention was first described in and claims the benefit of U.S. Provisional Application No. 60/815,384, filed Jun. 22, 2006, the entire disclosures of which are incorporated herein by reference.

FIELD OF THE INVENTION

The present invention relates generally to a wall-mounted, motion-activated, mechanical apparatus and, more particularly, to said apparatus having human finger-like appendages that automatically scratch a house pet, specifically a cat, when the pet becomes near to the apparatus.

BACKGROUND OF THE INVENTION

Cats not only require physical needs such food, water and shelter, they also require emotional necessities such as companionship, love and entertainment. Automated food feeders and full water bowls can provide the physical needs at all times even when the owner is not present, however the emotional needs are hard to provide if the owner is away at work or on a weekend vacation. These emotional needs are even more critical for young kittens who may find themselves alone for the first time in their lives. This insecurity can sometimes lead to destructive habits such as scratching.

Several attempts have been made in the past to create a device that automatically nurtures a small pet. U.S. Pat. No. 4,872,422 in the name of Della Vecchia discloses a mechanical device used to scratch and stroke household pets upon demand. A base is fastenable on a vertical structural element, and mounts a petting arm for vertically adjustable and foldable positioning perpendicularly thereto. The petting arm is a compound member interconnected in its medial part by a motivating mechanism that moves the outer portion, carrying a hand-like petting element in a petting and stroking fashion. The motivating mechanism may be electrically activated, and may include an electronic eye or position sensitive switch to sense pet position to institute petting upon pet demand. Vertical adjustment of the petting arm on the base allows use of the device with various sized animals. Unfortunately, this prior art example is not designed to provide a human-like petting motion for the pet during operation of the device.

U.S. Pat. No. 6,378,462 in the name of Gaves discloses an activity center for cats which includes a plurality of stations for grooming, massaging and stimulating the animal. The stations have wave-shaped fins, comb-like tines and raised pads. Unfortunately, this prior art example is not to designed to automatically sense when a pet is ready to be groomed and petted.

U.S. Pat. No. 5,842,440 in the name of Bell describes a self-grooming aid for animals, whereby they can brush their fur or hair and can exercise or sharpen their claws. Such an animal can stand at least partly on a base which is adapted to be clawed and with head or body at the level of a brush adapted to be rubbed. The brush is removable for cleaning or manually brushing the animal, and the mat is removable for replacement when thoroughly clawed. Unfortunately, this prior art example does not automatically respond to an animal and requires a user pet to manually groom themselves.

None of the prior art particularly describes an apparatus having human finger-like appendages that automatically scratch a house pet, specifically a cat, when the pet becomes near to the apparatus. Accordingly, there is a need for a means by which cats can be provided entertainment, companionship and solace when the owner is not present or available. The present invention satisfies such a need by providing a device that is convenient and easy to use, and lightweight yet durable in design. The automated pet scratching device includes finger-like protrusions that simulate the scratching motions of real fingers. The device further is adjustable to pets of varying sizes. The present invention is simple to use, inexpensive, and designed for many years of repeated use.

SUMMARY OF THE INVENTION

In view of the foregoing disadvantages inherent in the prior art, it has been observed that there is need for a means by which cats can be provided entertainment, companionship and solace when the owner is not present or available.

The scratching apparatus is a motion-activated mechanism that provides for the automatic scratching or petting of a cat. The invention consists of four independent mechanisms that look and move like fingers. The fingers would be made of plastic and covered with a lifelike latex covering. The fingers would be powered by a gear mechanism which receives mechanical energy from an electric motor. The invention is powered by a battery. Finally, a motion sensor, such as a close range infrared detector would cause the function when a cat would walk close by. The invention is mounted on a wall so that the fingers are right at the top of a cat's head. The use of the innovative apparatus provides a unique mechanism that not only provides enjoyment and functionality for a cat, but also provides comfort and companionship as well.

An automated pet scratching device includes a wall mountable plate, an enclosure slidably connected to the plate, and a plurality of scratching members disposed forwardly of the enclosure. Each of such scratching members is independently oscillated along a unique one of the travel paths, and is further juxtaposed along a width of the enclosure.

The device further includes a mechanism for automatically oscillating each of the scratching members along a plurality of travel paths when a pet is situated within a predetermined spatial distance from the enclosure. Such an oscillating mechanism effectively includes an extension rod with a rectilinear slide slot formed along a longitudinal length thereof. The oscillating mechanism further includes a motor housed within the enclosure, a motor bracket coupled to the plate and the motor respectively, a drive mechanism coupled to the motor, a crank mechanism coupled to the rod and the drive mechanism, a crank mechanism bracket anchored to the plate and the crank mechanism, and a pivot pin connected to the rod. Such a crank mechanism conveniently causes the rod to be adapted along a circular motion while reciprocating along a linear path of the slot, and each of the rods has a proximal end anchored to the crank mechanism and further has a distal end anchored to the scratching members.

The oscillating mechanism further includes an infrared motion sensor housed within the enclosure and a sensor control circuit electrically coupled to the motion sensor and the motor. Such a motion sensor advantageously generates and transmits a control signal to the control circuit upon detecting movement within the predetermined spatial distance, and the control circuit causes the motor to rotate in a predetermined direction which in turn transfers power to the drive mechanism which in turn transfers power to the crank mechanism. Finally the mechanism includes a power source and a control switch electrically coupled to the power source and the motion sensor.

A method of installing and utilizing a pet scratching device including the steps of: locating the device upon a suitable wall surface; attaching a plate of the device to the wall surface; securing an enclosure to the plate at a proper height along height adjustment tracks of the plate; adjusting and tightening a vertical position of the enclosure along the tracks; toggling a control switch to an on position; automatically generating and transmitting a control signal to a motor when a position of the pet is detected to fail within a predetermined spatial distance to the enclosure; and activating the motor and a plurality of extension rods to thereby cause a plurality of scratching members to independently oscillate along an orbital path.

The method further includes the step of generating and transmitting a second control signal to the motor when the pet is situated a distance greater than the predetermined spatial distance. Such a second control signal toggles the motor to an off position. The final step includes toggling the control switch to an off position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
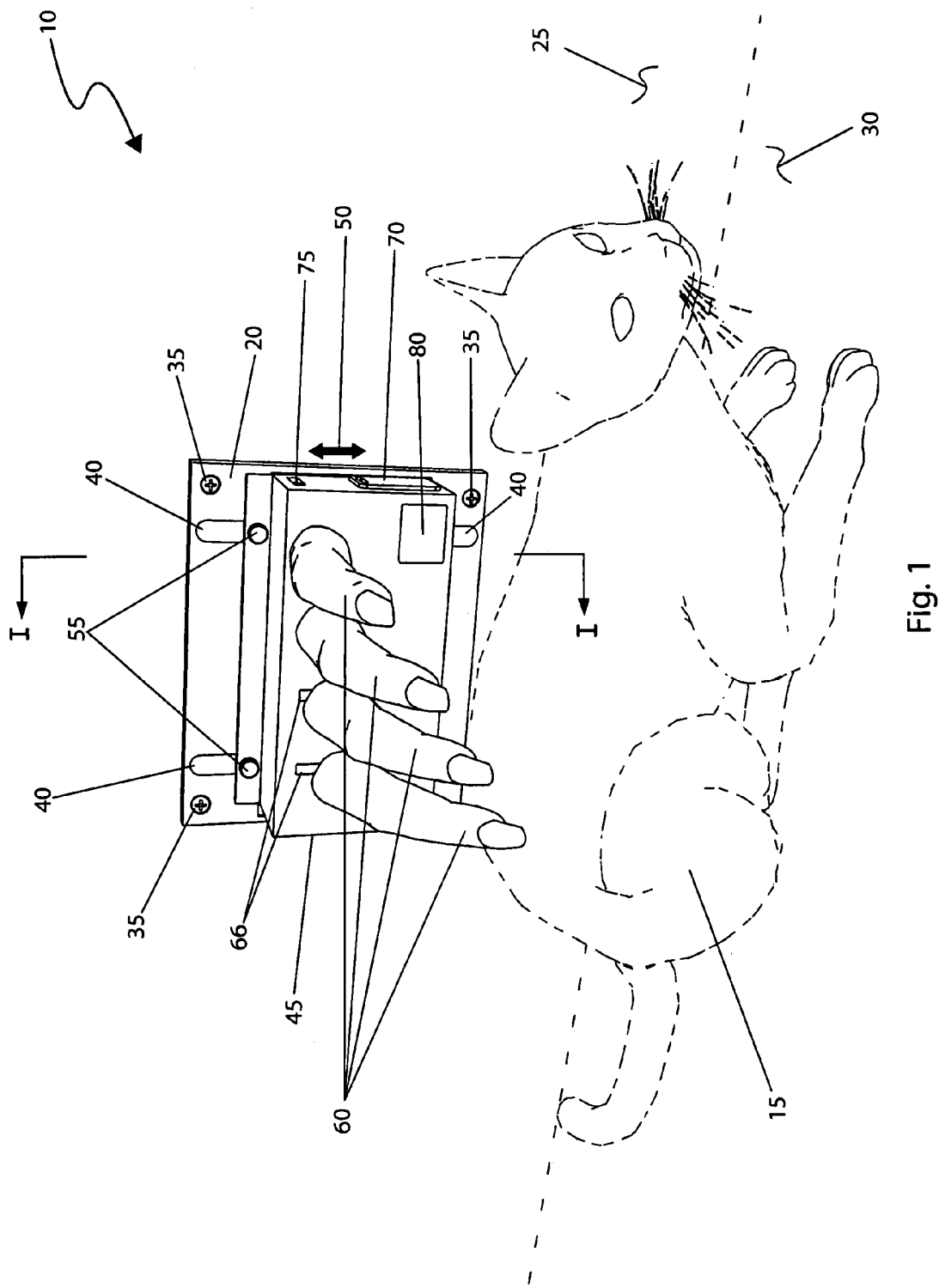
FIG. 1 is a front perspective view of an automated pet scratching apparatus 10 shown in use with a pet 15, according to a preferred embodiment of the present invention.

- 10 automated pet scratching apparatus
- 15 pet
- 20 mounting surface
- 25 wall surface
- 30 floor surface
- 35 first fastening device
- 40 height adjustment tracks
- 45 enclosure
- 50 first direction arrow
- 55 second fastening device
- 60 human digit replicas
- 61 digit motion
- 65 extension rods
- 67 crank mechanism
- 68 crank mechanism bracket
- 69 motor bracket
- 70 battery access door
- 75 on/off switch
- 80 infrared motion sensor
- 85 small direct current motor
- 90 sensor control circuit
- 95 drive mechanism
- 100 drive wheel
- 105 second direction arrow
- 110 first pivot pin
- 115 slide slot
- 120 second pivot pin
- 135 batteries
- 140 wiring

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for an automated pet scratching apparatus (herein described as the "apparatus") 10, which provides a means for petting or scratching of a house pet 15, such as a cat 15, comprising a wall-mounted 20, automatic, motion-activated 80 device 10. The apparatus 10 is configured with four (4) independent mechanisms resembling human fingers 60, less the thumb, in both appearance and in movement 61. The fingers 60 would be covered with a latex material to closely approximate the feel of real fingers. In operation, the artificial finger-like appendages 60 would be activated by a battery powered electrical motor 85 and a crank mechanism 67. A motion sensor 80 would activate the fingers 60 as a pet 15 came into close proximity of the invention 10.

Referring now to FIG. 1, a front perspective view of the apparatus 10 shown in use with a pet 15, according to the preferred embodiment of the present invention, is disclosed. The apparatus 10 is illustrated here petting or scratching a pet 15, depicted here as a cat 15; however, other animals such as dogs, rabbits, ferrets, guinea pigs, and the like commonly kept as household pets can be used with the invention 10 and thus should not be interpreted as a limiting factor of the present invention 10. The apparatus 10 consists of a wall mounting plate 20 mounted thereon a wall surface 25 near a floor surface 30. The mounting plate 20 is secured to the wall surface 25 using a series of first fastening devices 35 such as screws or the like. A set of height adjustment tracks 40 are provided thereon the mounting plate 20 to allow an enclosure 45 to slide up and down in the direction of a first direction arrow 50. The enclosure 45 is secured in position against the height adjustment tracks 40 using a second fastening device 55 such as a knurled knob or wing nut. The height adjustment tracks 40 allow the enclosure 45 to be adjusted to accommodate various size pets 15, and to accommodate a single pet 15 as it grows.

Located along a front surface of said enclosure 45 is a series of four (4) human digit replicas 60 that are each mounted on an extension rod 65. The human digit replicas 60 are envisioned to be made of a plastic or silicone rubber material with a latex covering to simulate the look and feel of real human skin and fingernails. The human digit replicas 60 provide a petting or scratching digit motion 61 in conjunction with the extension rods 65 located therein which move in a generally vertical circular motion along a vertical plane, thereby simulating a petting or scratching action. Automatic activation of the apparatus 10 is provided by an infrared motion sensor 80 well known in the art and being located along a front face of the enclosure 45. Thus, as long as the pet 15 is in close proximity to the apparatus 10, said apparatus 10 will be activated and a petting action by the human digit replicas 60 will commence. When the pet 15 walks away, the digit motion 61 will stop, thus conserving battery energy.

The wall mounting plate 20 and the enclosure 45 are envisioned to be made using a rigid plastic material such as polypropylene, acrylonitrile butadiene styrene (ABS), or the like.

Figure 2:
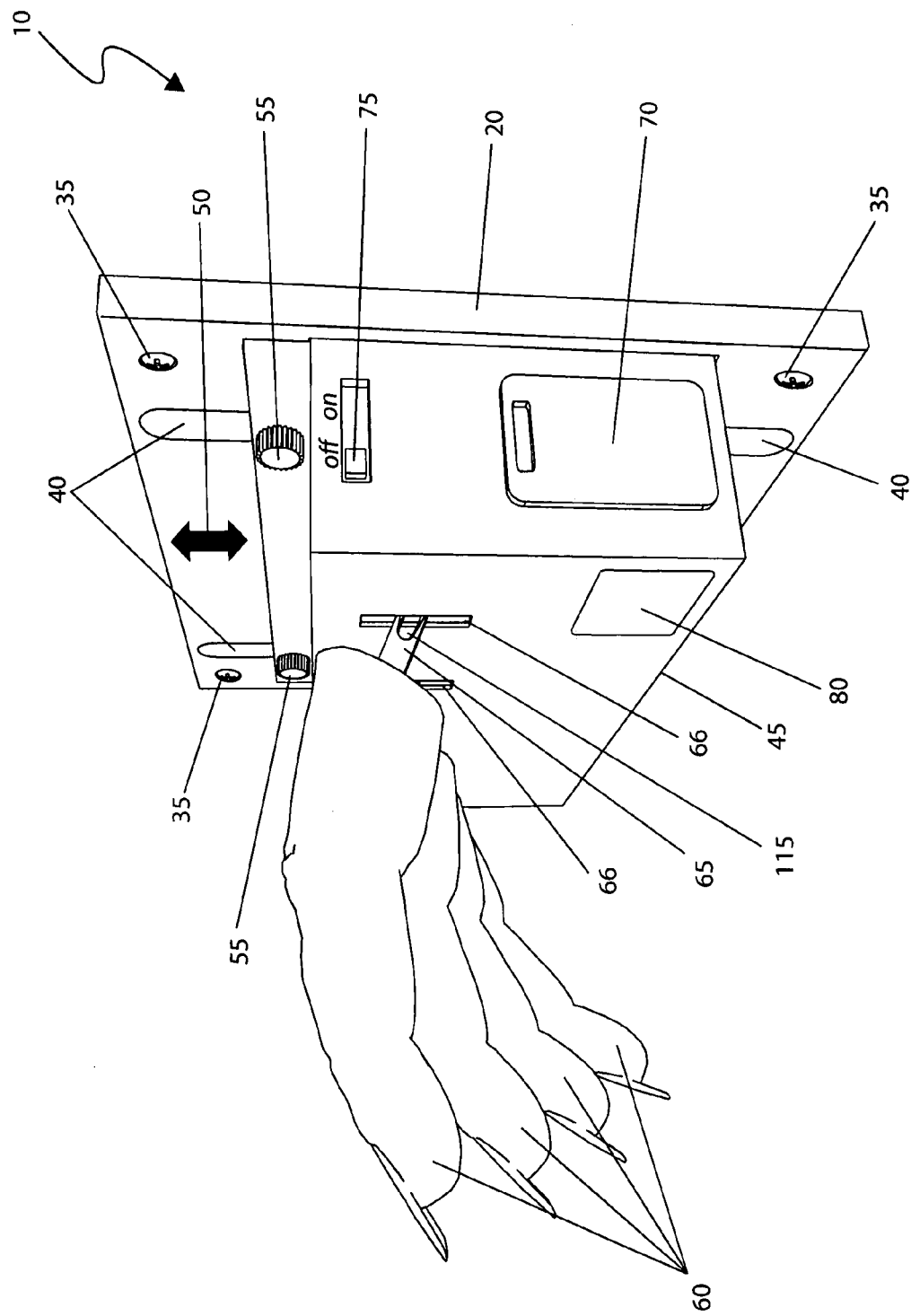
FIG. 2 is a side perspective view of an automated pet scratching apparatus 10, according to a preferred embodiment of the present invention.

Referring now to FIG. 2, a side perspective view of the apparatus 10, according to the preferred embodiment of the present invention, is disclosed. The apparatus 10 is powered by a plurality of disposable or rechargeable batteries 135 located behind a battery access door 70. This allows the apparatus 10 to be located without concern of an available power source or of electrocution of one's pet 15. An on/off switch 75 allows the apparatus 10 to be deactivated for a period of time. The battery access door 70 and the on/off switch 75 are envisioned to be located flush to and along a side surface of the enclosure 45 and to be made using similar materials as said enclosure 45.

Figure 3:
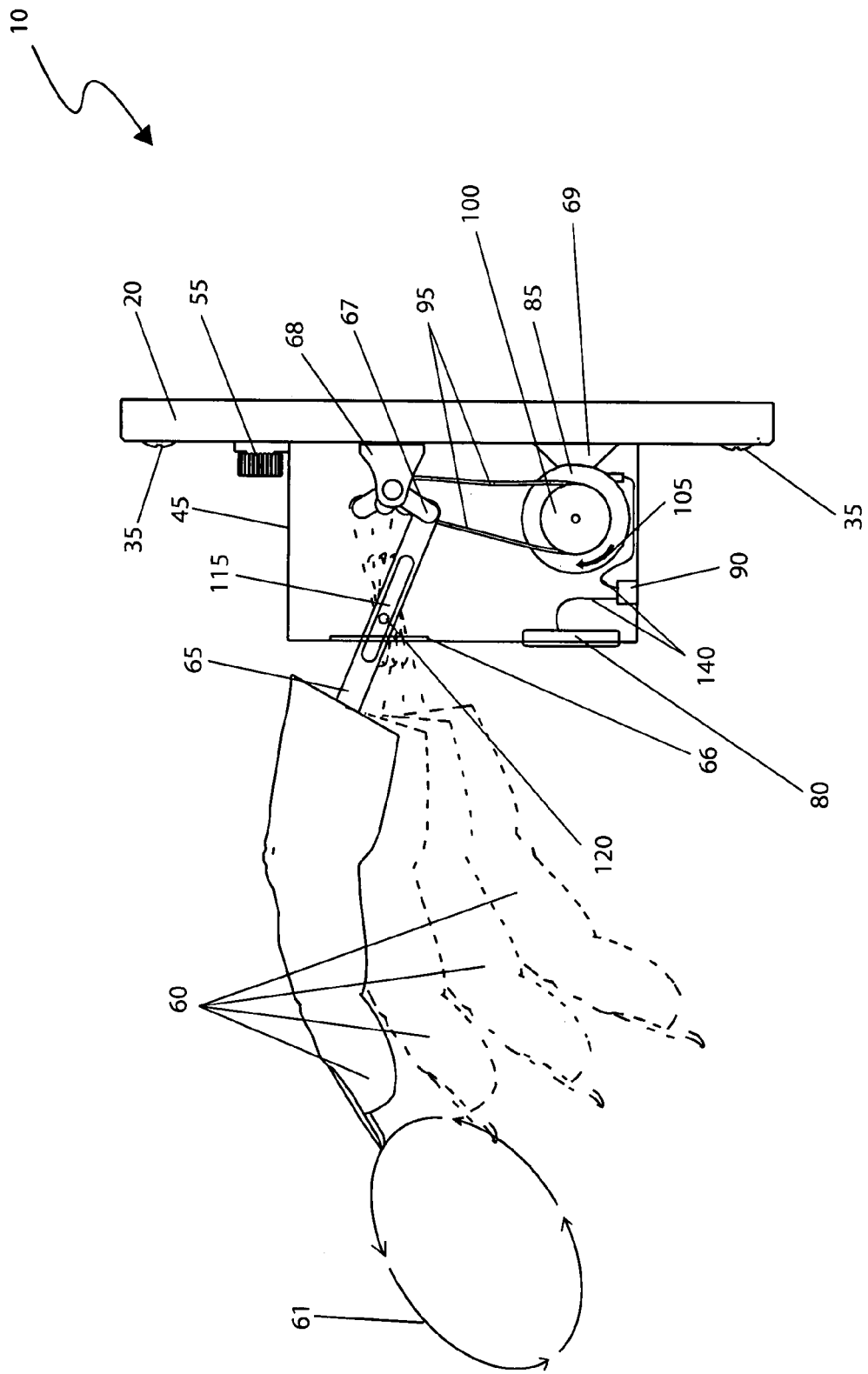
FIG. 3 is a sectional view of the automated pet scratching apparatus 10, as seen along a line I-I as shown in FIG. 1, according to a preferred embodiment of the present invention; and, FIG. 4 is a schematic block diagram of the electrical circuitry as used with the apparatus 10, according to a preferred embodiment of the present invention.

Referring now to FIG. 3, a sectional view of the apparatus 10, as seen along a line I-I as shown in FIG. 1, according to the preferred embodiment of the present invention, is disclosed. The apparatus 10 as illustrated here gives particular attention to particular drive components located inside the enclosure 45 comprising a motor 85, a motor bracket 69, a drive mechanism 95, a crank mechanism 67, a crank mechanism bracket 68, a first pivot pin 110, an extension rod 65, a second pivot pin 120, a slide slot 115, an infrared motion sensor 80, a plurality of wiring 140, and a sensor control circuit 90.

For purposes of clarity, only a single human digit replica 60 and associated drive components are illustrated and discussed here. The preferred embodiment of the apparatus 10 comprises four (4) human digit replicas 60 (see FIG. 1). The human digit replica 60 is depicted here at various points along a digit motion 61 produced by said drive mechanisms, thereby emulating a petting or scratching motion.

Physical power for the apparatus 10 is provided by a small direct current motor 85 attached thereto an interior surface of the enclosure 45 via a motor bracket 69. The small direct current motor 85 receives its power from the aforementioned batteries 135 and controlled by the on/off switch 75 and the infrared motion sensor 80 which operate in conjunction with an associated sensor control circuit 90 (see FIG. 1). Upon activation, rotary motion from the small direct current motor 85 is transferred to a drive wheel 100, as defined by a second direction arrow 105. The drive wheel 100 in turn transfers power to a drive mechanism 95 such as a drive belt. It should be noted that although a drive belt is depicted as the preferred method of the drive mechanism 95, those skilled in the art will realize that other drive mechanism 95 such as direct drive, gears, and the like can be used with equal effectiveness, and as such, should not be interpreted as a limiting factor of the present invention. The drive mechanism 95 in turn transfers power to a crank mechanism 67.

The crank mechanism bracket 68 provides a supporting means to said crank mechanism 67 being attached thereto an inner surface of the enclosure 45. The extension rod 65 comprises distal and proximal ends. The crank mechanism 67 comprises a multi-journal design providing an attachment means at a distal end of said extension rod 65 via a first pivot pin 110. The crank mechanism 67 further provides a circular motion along a vertical plane to said extension rod 65 as said crank mechanism 67 rotates. Additionally, the extension rod 65 further comprises a reciprocating motion element via a slide slot 115 at a central location thereupon and a stationarily mounted second pivot pin 120 moving sildingly therein. The extension rod 65 further comprises a human digit replica portion 60 mounted thereupon a proximal end. The aforementioned compound motion of the extension rod 65 produces a digit motion 61 to the human digit replica portion 60. Said digit motion 61 is generally an oblong circular motion within a vertical plane, thereby emulating the motion produced by a human hand when petting an animal 15. The aforementioned drive components are envisioned to be made using durable materials such as plated steel, stainless steel, or the like being manufactured using machining or stamping processes.

The descriptive text contained herein is generally reproduced four (4) times to produce the effects of four (4) different human digit replicas 60 moving in similar and/or sequential motion 61. It is envisioned that the small direct current motor 85, the drive mechanism 95, and the crank mechanism 67 are shared between each human digit replicas 60 and associated movements are translated via the multi journal crank mechanism 67.

It is further envisioned that the relative position of each crank mechanism journal 67 would be slightly offset for each of the human digit replicas 60 producing a sequential pattern. Such a feature allows one digit 60 to be moving backward, while another is lifting and yet another is advancing, and so forth. Said feature also reinforces the appearance and functionality of a human hand petting an animal 15 as well. However, those skilled in the art, will realize that numerous design variations to the mechanical components described herein may be introduced to produce a variety of desired petting and scratching motions to each human digit replica 60 individually and as such, should not be interpreted as a limiting factor of the present invention.

Figure 4:
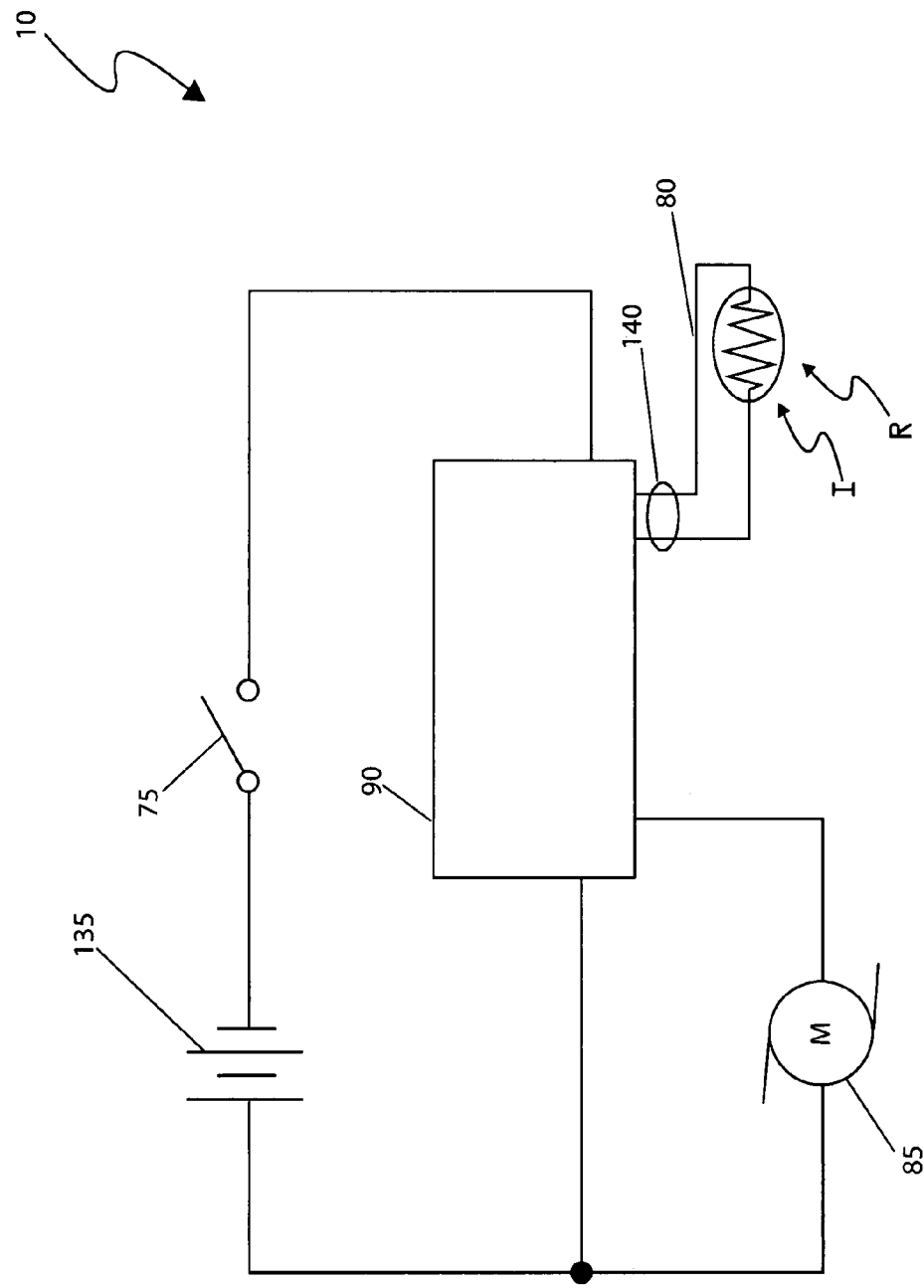

Referring now to FIG. 4, a schematic block diagram of the electrical circuitry as used with the apparatus 10, according to the preferred embodiment of the present invention, is disclosed. Electrical power in the form of direct current is derived from a set of rechargeable or disposable batteries 135. Power is then routed through the on/off switch 75 to allow for the manual shutdown of the apparatus 10 should it be desired. Then said electrical power is routed to the infrared motion sensor control circuit 90 as shown. Although an infrared detection system is depicted as the sensing mechanism associated with the apparatus 10, those skilled in the art, will realized that other methods of presence detection such as ultrasonic, proximity, thermal, rate of change detectors and the like could be used with equal effectiveness, and as such, should not be interpreted as a limiting factor of the present invention 10. The infrared motion sensor 80 is connected to the infrared motion sensor control circuit 90. Finally, output power from the infrared motion sensor control circuit 90 is routed to the small direct current motor 85. The other pole of the small direct current motor 85 is provided power by a shared common lead with the batteries 135 and the infrared motion sensor control circuit 90. In a likewise manner, when the infrared motion sensor 80 and the infrared motion sensor control circuit 90 no longer detect the presence of the pet 15 (as shown in FIG. 1), the presence of output voltage is removed and the small direct current motor 85 stops. The wiring 140 provides a means to transfer direct current power throughout the apparatus 10 using a plurality of common copper conductors 140 as shown.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: locating the apparatus 10 upon a suitable wall surface 25 with special emphasis given to the mounting height of said apparatus 10 from the floor surface 30 while accounting for present pet size 15 and future growth; attaching the apparatus 10 to the wall surface 25 using a series of first fastening devices 35; securing the enclosure 45 to the mounting plate 20 at the proper height along the height adjustment tracks 40 using the second fastening devices 55; adjusting and tightening the second fastening devices 55 as required to secure the height of the enclosure 45; installing a fresh set of batteries 135 into the battery access door 70; placing the apparatus 10 into an active or "ON" state using the on/off switch 75; detecting proximity of a pet 15 as it approaches the apparatus 10, its presence being detected by the infrared motion sensor 80 and associated infrared motion sensor control circuit 90; activating the motor 85 and internal mechanisms in conjunction with the extension rods 65 and human digit replicas 60 to produce a digit motion 61; positioning the pet 15 to obtain scratching, petting or affection on the desired part of its body; ceasing said motor 85 and digit motion 61 as the pet 15 is finished and walks away due to the infrared motion sensor 80 and the infrared motion sensor control circuit 90; repeating use of the apparatus 10 as desired; placing the apparatus 10 into an inactive or "OFF" state using the on/off switch 75 when desired; and, benefiting from the automatic function and the realistic petting and scratching motion 61 as applied to one's pet 15 in a safe and effective manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An automated pet scratching device comprising:
   a wall mountable plate;
   an enclosure slidably connected to said plate;
   a plurality of scratching members disposed forwardly of said enclosure; and,
   means for automatically oscillating each of said scratching members along a plurality of travel paths when a pet is situated within a predetermined spatial distance from said enclosure;
   wherein each of said scratching members are independently oscillated along a unique one of said travel paths;
   wherein said plate is located exterior of said enclosure; and
   wherein said means for automatically oscillating comprises:
   an extension rod having a rectilinear slide slot formed along a longitudinal length thereof;
   a motor housed within said enclosure;
   a motor bracket coupled to said plate and said motor respectively;
   a drive mechanism coupled to said motor;
   a crank mechanism coupled to said rod and said drive mechanism;
   a crank mechanism bracket anchored to said plate and said crank mechanism; and,
   a pivot pin connected to said rod;
   wherein said crank mechanism causes said rod to be adapted along a circular motion while reciprocating along a linear path of said slot.

2. The automated pet scratching device of claim 1, wherein said means for automatically oscillating further comprises:
   an infrared motion sensor housed within said enclosure; and,
   a sensor control circuit electrically coupled to said motion sensor and said motor;
   wherein said motion sensor generates and transmits a control signal to said control circuit upon detecting movement within the predetermined spatial distance, said control circuit causing said motor to rotate in a predetermined direction which in turn transfers power to said drive mechanism which in turn transfers power to said crank mechanism.

3. The automated pet scratching device of claim 2, wherein said means for automatically oscillating further comprises:
   a power source; and,
   a control switch electrically coupled to said power source and said motion sensor.

4. The automated pet scratching device of claim 1, wherein said rod has a proximal end anchored to said crank mechanism and further has a distal end anchored to said scratching members.

5. An automated pet scratching device comprising:
   a wall mountable plate;
   an enclosure slidably connected to said plate;
   a plurality of scratching members disposed forwardly of said enclosure; and,
   means for automatically oscillating each of said scratching members along a plurality of travel paths when a pet is situated within a predetermined spatial distance from said enclosure;
   wherein each of said scratching members are independently oscillated along a unique one of said travel paths;
   wherein said scratching members are juxtaposed along a width of said enclosure;
   wherein said plate is located exterior of said enclosure; and, wherein said means for automatically oscillating comprises:
   an extension rod having a rectilinear slide slot formed along a longitudinal length thereof;
   a motor housed within said enclosure;
   a motor bracket coupled to said plate and said motor respectively;
   a drive mechanism coupled to said motor;
   a crank mechanism coupled to said rod and said drive mechanism;
   a crank mechanism bracket anchored to said plate and said crank mechanism; and,
   a pivot pin connected to said rod;

wherein said crank mechanism causes said rod to be adapted along a circular motion while reciprocating along a linear path of said slot.

6. The automated pet scratching device of claim 5, wherein said means for automatically oscillating further comprises:
an infrared motion sensor housed within said enclosure; and,
a sensor control circuit electrically coupled to said motion sensor and said motor;
wherein said motion sensor generates and transmits a control signal to said control circuit upon detecting movement within the predetermined spatial distance, said control circuit causing said motor to rotate in a predetermined direction which in turn transfers power to said drive mechanism which in turn transfers power to said crank mechanism.

7. The automated pet scratching device of claim 6, wherein said means for automatically oscillating further comprises:
a power source; and,
a control switch electrically coupled to said power source and said motion sensor.

8. The automated pet scratching device of claim 5, wherein said rod has a proximal end anchored to said crank mechanism and further has a distal end anchored to said scratching members.

* * * * *